United States Patent
Matsuura et al.

(10) Patent No.: US 11,227,373 B2
(45) Date of Patent: Jan. 18, 2022

(54) DETECTION EQUIVALENCE EVALUATION METHOD AND DETECTION EQUIVALENCE EVALUATION DEVICE

(71) Applicant: MITSUBISHI HEAVY INDUSTRIES, LTD., Tokyo (JP)

(72) Inventors: Naoki Matsuura, Tokyo (JP); Mitsuyoshi Uematsu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 321 days.

(21) Appl. No.: 16/438,938

(22) Filed: Jun. 12, 2019

(65) Prior Publication Data
US 2019/0385296 A1    Dec. 19, 2019

(30) Foreign Application Priority Data

Jun. 13, 2018 (JP) .............................. JP2018-113092

(51) Int. Cl.
*G06T 7/00* (2017.01)

(52) U.S. Cl.
CPC .. *G06T 7/0002* (2013.01); *G06T 2207/10141* (2013.01); *G06T 2207/30168* (2013.01)

(58) Field of Classification Search
CPC ......... G06T 7/0002; G06T 2207/10141; G06T 2207/30168
See application file for complete search history.

(56) References Cited

FOREIGN PATENT DOCUMENTS

JP    2013-195119    9/2013

OTHER PUBLICATIONS

JP2013195119A Sakai et al, Google translation (Year: 2013).*

* cited by examiner

*Primary Examiner* — Jianxun Yang
(74) *Attorney, Agent, or Firm* — Wenderoth, Lind & Ponack, L.L.P.

(57) ABSTRACT

A method of evaluating equivalence of detection performances of an object to be photographed using a film image and a digital image. The method includes acquiring digital images of the object with varying values of an influence parameter; acquiring digital detection limit values of the respective digital images; specifying a digital detection limit value with highest detection performance from the digital detection limit values; determining that there is equivalence when the specified digital detection limit value is equal to or more than a film detection limit value of the film image, because the detection performance of the object using the digital image assures the detection performance of the object using the film image; and determining that there is no equivalence when the specified digital detection limit value is smaller than the film detection limit value.

5 Claims, 3 Drawing Sheets

DETECTION EQUIVALENCE EVALUATION METHOD AND DETECTION EQUIVALENCE EVALUATION DEVICE

CROSS-REFERENCE TO RELATED APPLICATIONS

The present application claims priority to and incorporates by reference the entire contents of Japanese Patent Application No. 2018-113092 filed in Japan on Jun. 13, 2018.

FIELD

The present invention relates to a detection equivalence evaluation method and a detection equivalence evaluation device that evaluate the equivalence of detection performance of a film image and a digital image.

BACKGROUND

A radiographic testing includes a system that acquires a transmission image of an object to be photographed, through chemical changes of silver particles in a film that are sensitive to radiation (hereinafter, referred to as a film system). The radiographic testing also includes a system that acquires a transmission image of an object to be photographed through an image element sensitive to radiation (hereinafter, referred to as a digital system).

At present, in the radiographic testing, a film image is mainly obtained through the film system. However, when the film system is used, the time required for testing is long. Thus, to improve the working efficiency, the film system is expected to be replaced with the digital system. In the radiographic testing, when the film system is replaced with the digital system, it is necessary to assure that the detection performance of the digital image obtained through the digital system is equal to or more than the detection performance of the film image.

Conventionally, an inspection method of performing a sharpening process on a digital image converted from a film image, and detecting a defect of an object to be inspected, by using the digital image on which the sharpening process is performed has been known (for example, see Japanese Patent Application Laid-open No. 2013-195119).

SUMMARY

Japanese Patent Application Laid-open No. 2013-195119 discloses a technology for assuring the inspection quality by a digital image, when a film image is converted to the digital image. Thus, in Japanese Patent Application Laid-open No. 2013-195119, the replacement with the digital system is difficult, because the film image is obtained through the film system.

Consequently, an object of the present invention is to provide a detection equivalence evaluation method and a detection equivalence evaluation device that can suitably evaluate whether the equivalence of the detection performance of the film image and the digital image can be assured, when the film image is to be replaced with the digital image.

SUMMARY OF THE INVENTION

A method of evaluating equivalence of detection performance according to an aspect of the present invention is a method of evaluating equivalence of detection performance of an object to be photographed using a film image obtained by exposing a film to light and detection performance of the object to be photographed using a digital image obtained by causing an image element to receive light. The method includes: acquiring the film image of the object to be photographed based on a specified condition in which detection performance is assured in advance; acquiring a film detection limit value that is a limit value of detection performance of the acquired film image; acquiring a plurality of first digital images of the object to be photographed with varying values of a plurality of parameters included in at least one of a photographing condition of the object to be photographed and an image quality condition of the digital image; acquiring a plurality of first digital detection limit values that are limit values of detection performance of the respective first digital images; specifying, based on relations between the first digital detection limit values and the parameters whose values are varied, an influence parameter that affects the detection performance of the digital image from the parameters; acquiring a plurality of second digital images of the object to be photographed with varying values of the specified influence parameter; acquiring a plurality of second digital detection limit values of the respective second digital images; specifying a second digital detection limit value with highest detection performance from the second digital detection limit values; determining that there is equivalence when the specified second digital detection limit value is equal to or more than the film detection limit value, because the detection performance of the object to be photographed using the digital image assures the detection performance of the object to be photographed using the film image; and determining that there is no equivalence when the specified second digital detection limit value is smaller than the film detection limit value, because the detection performance of the object to be photographed using the digital image does not assure the detection performance of the object to be photographed using the film image.

A detection equivalence evaluation device according to another aspect of the present invention includes a processor configured to evaluate equivalence of detection performance of an object to be photographed using a film image obtained by exposing a film to light and detection performance of the object to be photographed using a digital image obtained by causing an image element to receive light. The processor is configured to: acquire the film image of the object to be photographed based on a specified condition in which detection performance is assured in advance; acquire a film detection limit value that is a limit value of detection performance of the acquired film image; acquire a plurality of first digital images of the object to be photographed with varying values of a plurality of parameters included in at least one of a photographing condition of the object to be photographed and an image quality condition of the digital image; acquire a plurality of first digital detection limit values that are limit values of detection performance of the respective first digital images; specify, based on relations between the first digital detection limit values and the parameters whose values are varied, an influence parameter that affects the detection performance of the digital image from the parameters; acquire a plurality of second digital images of the object to be photographed with varying values of the specified influence parameter; acquire a plurality of second digital detection limit values of the respective second digital images; specify a second digital detection limit value with highest detection performance from the second digital detection limit values; determine that there is equivalence when the specified second digital detection limit value is equal to or more than the film detection limit value, because the detection performance of the object to be photographed using the digital image assures the detection performance of the object to be photographed using the film image; and determine that there is no equivalence when the specified second digital detection limit value is smaller than the film detection limit value, because the detection performance of the object to be photographed using the digital image does not assure the detection performance of the object to be photographed using the film image.

With this configuration, it is possible to suitably evaluate the equivalence of the digital image with respect to the film image. Consequently, it is possible to acquire a digital image having detection performance equal to or more than that of the film image, by taking a digital image of an object to be photographed, on the basis of at least one of the conditions between the photographing conditions and the image quality conditions corresponding to the digital image that is determined to have equivalence. In this example, the film detection limit value and the digital detection limit value are the size of a defect generated on the object to be photographed that is to be a detectable limit, for example. However, these values are not particularly limited, and the film detection limit value and the digital detection limit value may be any value as long as the value can be used to determine the detection limit of the image. Consequently, for example, it is possible to suitably detect a defect generated on the object to be photographed, and can inspect the object to be photographed by the digital image. In this example, the film image can be obtained by a system that acquires a transmission image of an object to be photographed, through chemical changes of silver particles in a film that are sensitive to radiation, for example. Moreover, the digital image can be obtained by a system that acquires a transmission image of the object to be photographed through an image element sensitive to radiation. The film image may also be obtained through a film exposed to the irradiated light in addition to using radiation. Similarly, the digital image may also be obtained through an image element that receives irradiated light in addition to using radiation, and is not particularly limited.

In the method, it is preferable that acquiring the first digital images includes selecting the parameters whose values are to be varied based on an experimental planning method.

With this configuration, because it is possible to effectively select a combination of the parameters with varied parameter values, it is possible to improve the work efficiency at the first digital image acquisition step.

In the method, it is preferable that at acquiring the first digital images, the first digital images of the object to be photographed are acquired with varying values of the parameters included in the photographing condition of the object to be photographed, acquiring the second digital images includes setting the parameters of the image quality condition of the second digital images as a plurality of evaluation indexes, and acquiring the evaluation indexes by associating the evaluation indexes with the second digital detection limit values of the second digital images, and the method further includes determining, when it is determined that there is equivalence, whether there is correlation between the second digital detection limit values and the evaluation indexes to acquire the evaluation index having correlation.

With this configuration, it is possible to specify the evaluation index that affects the digital detection limit value, in other words, the parameter in the image quality conditions.

In the method, it is preferable that by using the evaluation indexes having correlation with the second digital detection limit values, a determination index value that is an index value of the evaluation index corresponding to the film detection limit value is derived in advance, and the method further includes acquiring a current index value of the evaluation index for a current digital image having correlation with the second digital detection limit value; determining, when the current index value is equal to or more than the determination index value, that the detection performance of the object to be photographed using the digital image assures the detection performance of the object to be photographed using the film image; and determining, when the current index value is smaller than the determination index value, that the detection performance of the object to be photographed using the digital image does not assure the detection performance of the object to be photographed using the film image.

With this configuration, it is possible to determine whether the detection performance of the digital image assures the detection performance of the film image, using the evaluation index (parameter in the image quality conditions) correlated with the digital detection limit value. Consequently, for example, when it is determined that the detection performance of the digital image does not assure the detection performance of the film image, it is possible to notify such as to urge the replacement of the image element, to improve the current index value, in other words, to improve the image quality of the digital image.

DESCRIPTION OF EMBODIMENTS

Hereinafter, an embodiment according to the present invention will be described in detail with reference to the accompanying drawings. It is to be noted that the invention is not limited to the embodiment. Moreover, components in the following embodiment include components that can be easily replaced by those skilled in the art, or components substantially the same as those components. Furthermore, the components described below can be combined with one another as appropriate. Still furthermore, when there are a plurality of embodiments, the embodiments may be combined with one another.

EMBODIMENT

A detection equivalence evaluation method according to the present embodiment is a method for evaluating the equivalence of detection performance of an object to be photographed using a film image obtained by exposing a film to light, and detection performance of an object to be photographed using a digital image obtained by causing an image element to receive light. More specifically, the object to be photographed is an aircraft component, and the film image and the digital image are images to be photographed to detect a defect generated in the aircraft component.

The film image is an image obtained by irradiating an object to be photographed with radiation, and by exposing the radiation that has transmitted through the object to be photographed, on a film containing silver particles. Moreover, the digital image is an image obtained by irradiating an object to be photographed with radiation, and by causing the image element to receive the radiation that has transmitted through the object to be photographed. In the present embodiment, the film image and the digital image are acquired by irradiating the object to be photographed with radiation. However, it is not limited thereto, and the film image and the digital image can also be acquired by irradiating the object to be photographed with light.

Figure 2:
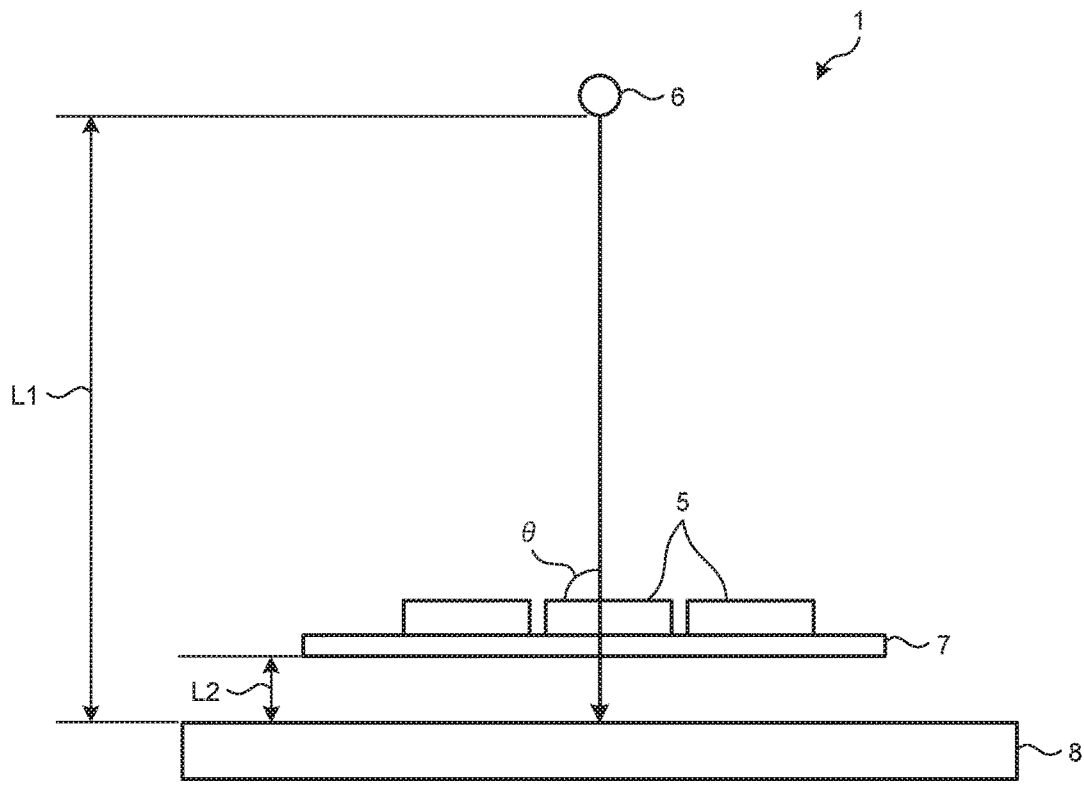
FIG. 2 is a schematic view of a photographing device that takes a digital image.

In this example, with reference to FIG. 2, a photographing device 1 that acquires a digital image will be briefly described. FIG. 2 is a schematic view of a photographing device that takes a digital image. The photographing device 1 is configured by including a radiation source 6, a shielding plate 7, and an image element 8. In the photographing device 1, a test piece 5 that is an object to be photographed is disposed between the radiation source 6 and the image element 8. A defect is formed in the test piece 5, and for example, a composite material acquired by impregnating a reinforcing fiber with resin and the like, is used as the material. The radiation source 6 is provided facing the image element 8, and emits radiation toward the test piece 5. The shielding plate 7 is provided between the test piece 5 and the image element 8, and is formed of an aluminum material capable of shielding alpha radiation and beta radiation. For example, the image element 8 is a radiation image pickup device called a digital detector array (DDA) or a flat panel detector (FPD). By irradiating the test piece 5 with radiation, the photographing device 1 acquires a digital image of the test piece 5 from the image element 8.

When the photographing device 1 is used to take a digital image, a plurality of parameters in the photographing conditions are varied to evaluate the equivalence of detection performance. As illustrated in FIG. 2, for example, the parameters in the photographing conditions include distance L1 between the radiation source 6 and the image element 8 in the irradiation direction of radiation, distance L2 between the shielding plate 7 and the image element 8 in the irradiation direction of radiation, and an irradiation angle θ of radiation with respect to the test piece 5. Moreover, in addition to the distance L1, the distance L2, and the irradiation angle θ, the parameters in the photographing conditions include tube voltage applied to generate radiation, the exposure dose of radiation, the number of processes for performing averaging processing on the acquired digital image, and the like. It is to be noted that the parameters in the photographing conditions are not particularly limited to the parameters described above.

Figure 1:
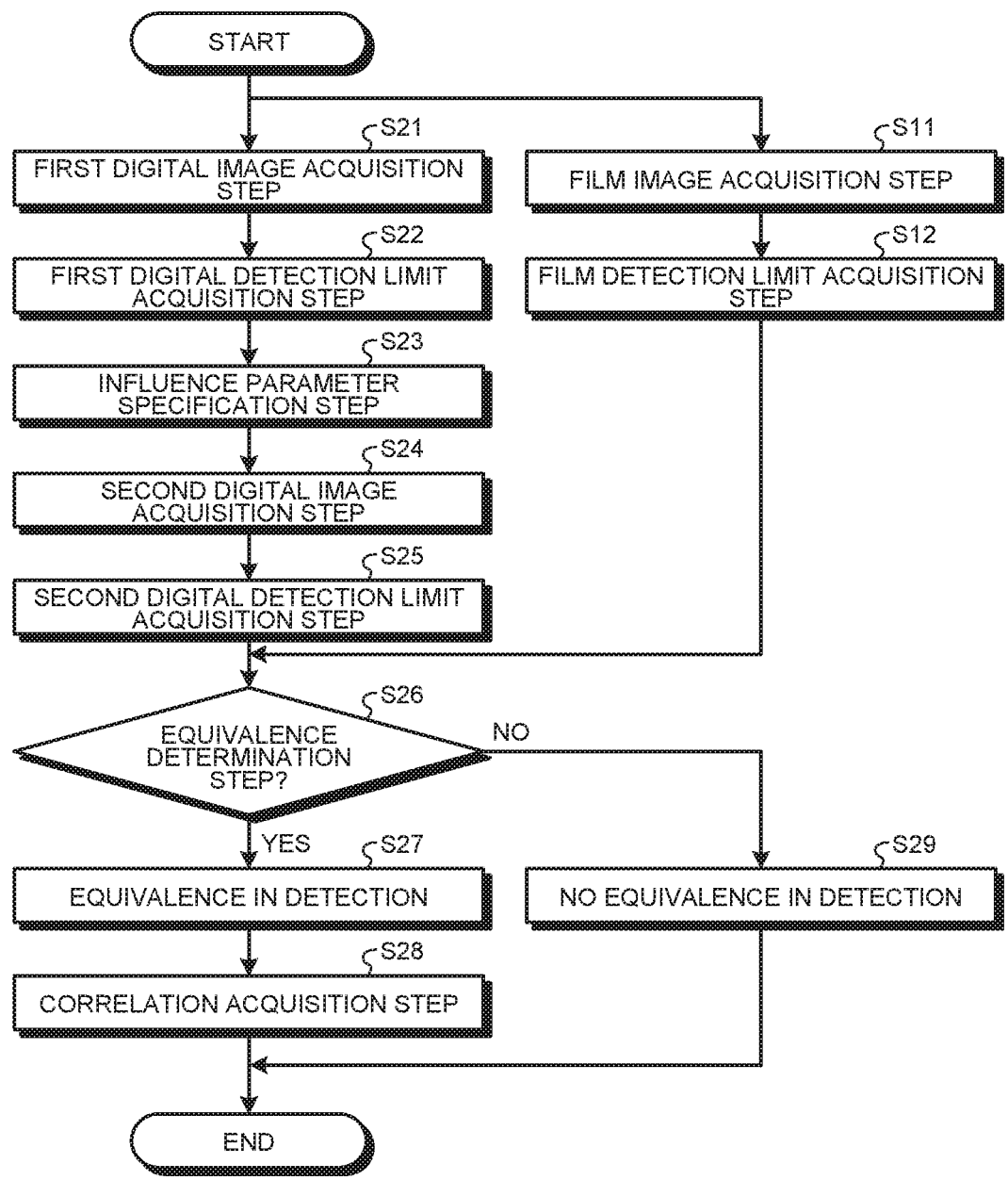
FIG. 1 is a flowchart of an example of a detection equivalence evaluation method according to an embodiment.

Next, with referenced to FIG. 1, the detection equivalence evaluation method will be described. FIG. 1 is a flowchart of an example of the detection equivalence evaluation method according to the present embodiment. The detection equivalence evaluation method evaluates the equivalence of detection performance, by comparing between a digital detection limit value that is a limit value of the detection performance of a digital image, and a film detection limit value that is a limit value of the detection performance of a film image.

More specifically, in the detection equivalence evaluation method, a film image of the test piece 5 is first acquired on the basis of specified conditions in which the detection performance is assured in advance (step S11: film image acquisition step). In other words, the film image acquisition step S11 is a step for acquiring a film image using a conventional film system. At the film image acquisition step S11, a plurality of film images are acquired by varying the size of a defect formed on the test piece 5.

Then, after performing the film image acquisition step S11, a film detection limit value of the acquired film image is acquired (step S12: film detection limit acquisition step). At the film detection limit acquisition step S12, a plurality of the film images with different sizes of defects that are acquired at the film image acquisition step S11 are inspected by an inspector. Then, the size of a detectable defect is acquired as a film detection limit value. In other words, at the film detection limit acquisition step S12, the minimum detectable size of the defect of the test piece 5 is acquired as a film detection limit value from the film images.

Moreover, in the detection equivalence evaluation method, in parallel with the film image acquisition step S11 and the film detection limit acquisition step S12, the following step S21 to step S24 are executed. It is to be noted that step S21 to step S24 may be performed as preceding steps of the film image acquisition step S11 and the film detection limit acquisition step S12, or may be performed as subsequent steps of the film image acquisition step S11 and the film detection limit acquisition step S12, and the order is not particularly limited.

In the detection equivalence evaluation method, a plurality of digital images of the test piece 5 are acquired, by varying the parameter values of the parameters in the photographing conditions of the test piece 5 (step S21: first digital image acquisition step). In this process, because there are a number of parameters in the photographing conditions described above, when the parameter values are varied, the number of combinations become enormous. Thus, at the first digital image acquisition step S21, the parameters with varied parameter values are selected on the basis of an experimental planning method. For example, as the experimental planning method, the Taguchi method known as quality engineering is used. Moreover, at the first digital image acquisition step S21 also, the digital images are acquired by varying the size of a defect formed on the test piece 5 for a single combination.

Then, after performing the first digital image acquisition step S21, a digital detection limit value of each of the acquired digital images is acquired (step S22: first digital detection limit acquisition step). At the first digital detection limit acquisition step S22, the digital images with different sizes of defects that are acquired at the first digital image acquisition step S21 are inspected by an inspector. Then, the size of a detectable defect is acquired as a digital detection limit value. In this process, the digital detection limit value of the digital image is associated with the parameter values of the parameters.

Next, after performing the first digital detection limit acquisition step S22, an influence parameter that influences the detection performance of the digital image is specified from the parameters, from a relation between a plurality of the acquired digital detection limit values and the parameters with varied parameter values (step S23: influence parameter specification step). At the influence parameter specification step S23, an influence parameter is extracted on the basis of the experimental planning method at the first digital image acquisition step S21.

Then, after performing the influence parameter specification step S23, digital images of the test piece 5 are acquired by varying the parameter values of one or more of the specified influence parameters (step S24: second digital image acquisition step). At the second digital image acquisition step S24 also, the digital images are acquired by varying the size of the defect formed on the test piece 5 for a single combination. Moreover, at the second digital image acquisition step S24, along with the test piece 5, an image quality indicator for acquiring the parameter in the image quality conditions of a digital image is also photographed.

In this example, the parameter in the image quality conditions includes a signal-to-noise ratio (SN ratio), resolving power, a contrast-to-noise ratio, a pixel value (PV), and the like, for example. The parameters in the image quality conditions are not particularly limited to the parameters described above. The parameters in the image quality conditions are used as a plurality of evaluation indexes of a digital image.

At the second digital image acquisition step S24, along with the digital images, a parameter value of a parameter in the image quality conditions associated with each of the digital images is acquired.

Then, after performing the second digital image acquisition step S24, a digital detection limit value of each of the acquired digital images is acquired (step S25: second digital detection limit acquisition step). At the second digital detection limit acquisition step S25, the digital images with different sizes of defects that are acquired at the second digital image acquisition step S24 are inspected by an inspector. Then, the size of a detectable defect is acquired as a digital detection limit value. Then, at the second digital detection limit acquisition step S25, the digital detection limit value with the highest detection performance is specified from the acquired digital detection limit values. More specifically, the digital detection limit value with the highest detection performance is the minimum detectable size of the defect of the test piece 5.

Then, on the basis of the film detection limit value acquired at the film detection limit acquisition step S12 and the digital detection limit value specified at the second digital detection limit acquisition step S25, the equivalence of the detection performance is determined (step S26: equivalence determination step). At the equivalence determination step S26, when the specified digital detection limit value is equal to or more than the film detection limit value (Yes at step S26), in other words, when the size of the defect that can be detected in the digital image is equal to or smaller than the size of the defect that can be detected in the film image, it is determined that there is equivalence, because the detection performance of the digital image assures the detection performance of the film image (step S27). Alternatively, at the equivalence determination step S26, when the specified digital detection limit value is smaller than the film detection limit value (No at step S26), in other words, when the size of the defect that can be detected in the digital image is larger than the size of the defect that can be detected in the film image, it is determined that there is no equivalence, because the detection performance of the digital image does not assure the detection performance of the film image (step S29).

Figure 5:
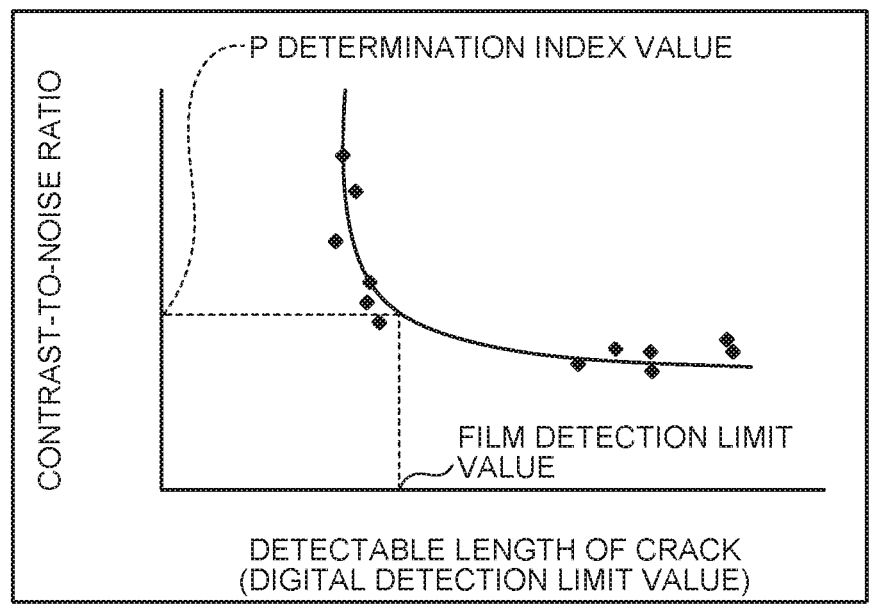
FIG. 5 is a graph of an example of an evaluation index having correlation with a digital detection limit value.

After performing step S27, the presence of correlation between the digital detection limit values acquired at the second digital detection limit acquisition step S25 and the evaluation indexes is determined, and an evaluation index having correlation is acquired (step S28: correlation acquisition step). With reference to FIG. 5, an example of the evaluation index having correlation will now be described.

FIG. 5 is a graph of an example of an evaluation index having correlation with a digital detection limit value. In FIG. 5, the horizontal axis is the size (length) of a detectable defect (crack), and is a value corresponding to the digital detection limit value. In the horizontal axis, the digital detection limit value is reduced with an increase in the crack length (toward right in FIG. 5), and the digital detection limit value is increased with a reduction in the crack length (toward left in FIG. 5). Moreover, in FIG. 5, the vertical axis is a contrast-to-noise ratio, which is one of the evaluation indexes. In the vertical axis, the image quality of the digital image is increased with an increase in the contrast-to-noise ratio (upward in FIG. 5), and the image quality of the digital image is reduced with a reduction in the contrast-to-noise ratio (downward in FIG. 5).

In FIG. 5, the digital detection limit values acquired at the second digital detection limit acquisition step S25 are correlated with a plurality of the contrast-to-noise ratios associated with the digital detection limit values. Consequently, it is possible to obtain a correlation equation (fitting equation) for interpolating the values.

After performing the correlation acquisition step S28, or after performing step S29, the flow of the detection equivalence evaluation method is finished.

Figure 4:
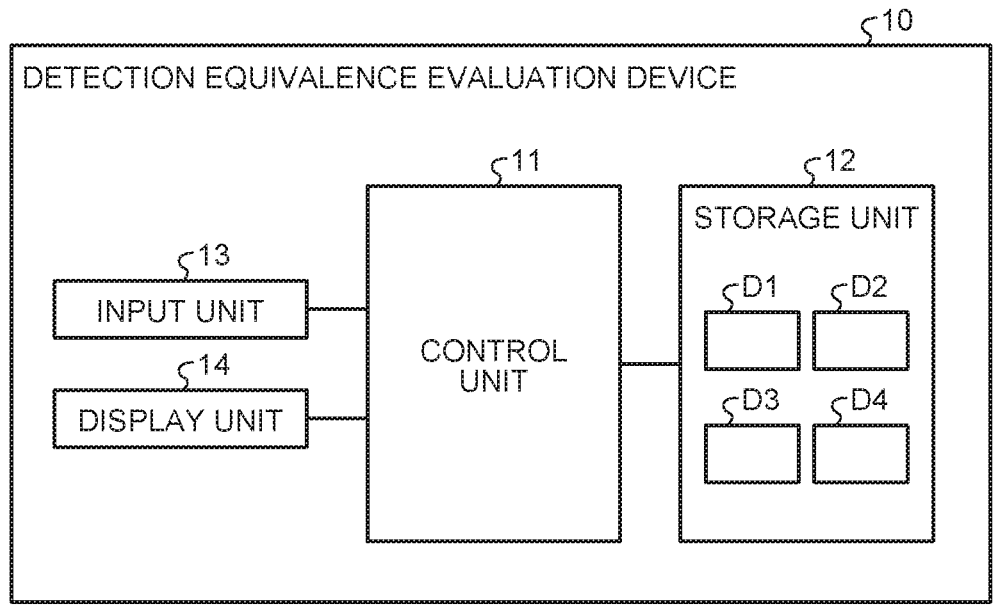
FIG. 4 is a schematic view of a detection equivalence evaluation device according to the present embodiment.

In this example, the detection equivalence evaluation method illustrated in FIG. 1 may be executed by a detection equivalence evaluation device 10 illustrated in FIG. 4, for example. The detection equivalence evaluation device 10 includes a control unit (processing unit) 11, a storage unit 12, an input unit 13, and a display unit 14. The control unit 11 can execute the steps of the detection equivalence evaluation method illustrated in FIG. 1 as various processes. The storage unit 12 stores therein data required for executing the various processes. The input unit 13 is configured of an input device such as a keyboard. The display unit 14 is configured of a display device such as a monitor. The detection equivalence evaluation device 10 may be configured as a single device, or may be integrally configured with other devices. The detection equivalence evaluation device 10 may also be configured as a system in which various devices such as an arithmetic device and a data server are combined, and is not particularly limited.

For example, the storage unit 12 stores therein a digital image D1 to be acquired, a film detection limit value D2, a digital detection limit value D3, information D4 on the parameters in the photographing conditions and the image quality conditions, and the like, as data. The data D1, D2, D3, and D4 are used for the equivalence evaluation described above.

The control unit 11 acquires the various data D1, D2, D3, and D4 stored in the storage unit 12, and executes the steps of the detection equivalence evaluation method as various processes on the basis of the acquired data. In other words, the control unit 11 executes the film image acquisition step S11 as a film image acquisition process. Similarly, the control unit 11 executes the film detection limit acquisition step S12, the first digital image acquisition step S21, the first digital detection limit acquisition step S22, the influence parameter specification step S23, the second digital image acquisition step S24, the second digital detection limit acquisition step S25, the equivalence determination step S26, and the correlation acquisition step S28, as a film detection limit acquisition process, a first digital image acquisition process, a first digital detection limit acquisition process, an influence parameter specification process, a second digital image acquisition process, a second digital detection limit acquisition process, an equivalence determination process, and a correlation acquisition process.

In this example, in the film detection limit acquisition process, when a defect of the test piece 5 is to be detected from the acquired film images, for example, the film image and sample data on the defect of the test piece 5 may be learned through machine learning in advance, and the control unit 11 may detect the defect of the test piece 5 from the film image, on the basis of determination criteria obtained by the machine learning. Similarly, in the first digital detection limit acquisition process and the second digital detection limit acquisition process, the control unit 11 may also detect the defect of the test piece 5 from the digital image, on the basis of the determination criteria obtained by the machine learning.

Figure 3:
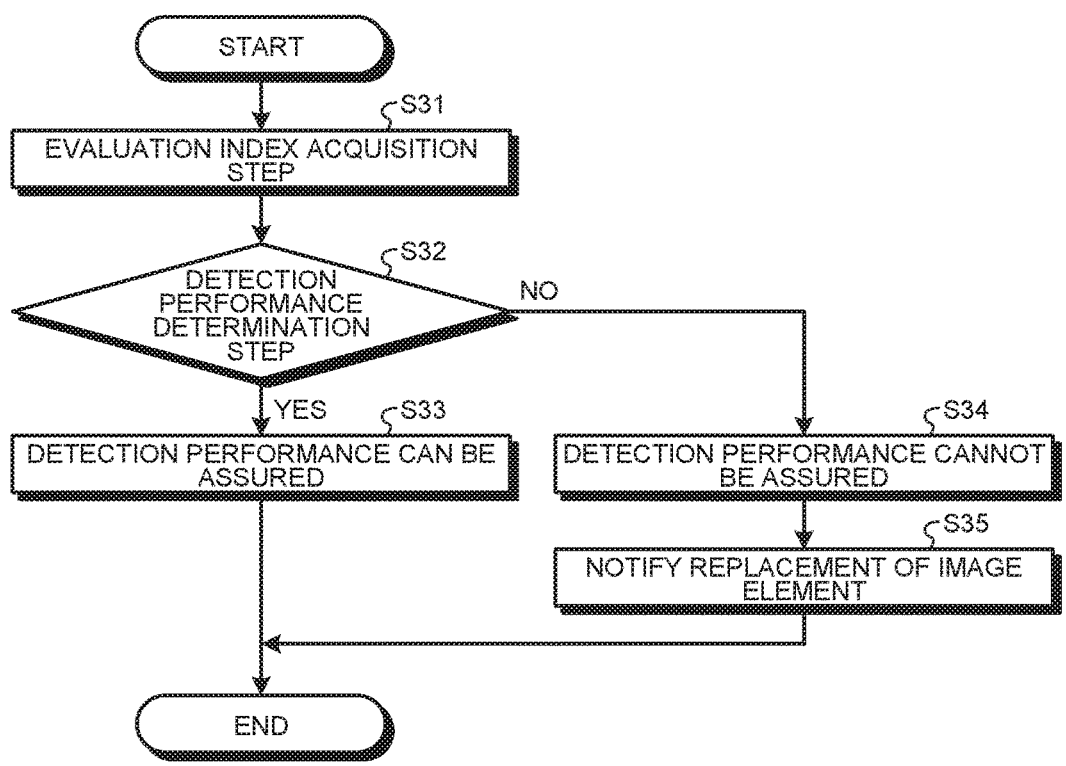
FIG. 3 is a flowchart of an example of the detection equivalence evaluation method according to the present embodiment.

Next, with reference to FIG. 3 and FIG. 5, another example of the detection equivalence evaluation method will be explained. For example, the detection equivalence evaluation method illustrated in FIG. 3 is a method performed after the film image is replaced with the digital image, and is a method for determining whether the detection performance of the digital image is assured, on the basis of the evaluation index in FIG. 5.

First, in the detection equivalence evaluation method, by using the evaluation index (contrast-to-noise ratio) that is derived at the correlation acquisition step S28 and that has correlation with the digital detection limit value illustrated in FIG. 5, a determination index value P that is an index value of an evaluation index corresponding to the film detection limit value is derived in advance.

Next, while acquiring the digital image, the current index value of the evaluation index in the current digital image is acquired (step S31: evaluation index acquisition step). At the evaluation index acquisition step S31, the current index value of the evaluation index is acquired using a method similar to the second digital image acquisition step S24.

Then, on the basis of the determination index value P derived in advance and the current index value acquired at the evaluation index acquisition step S31, it is determined whether the detection performance is assured (step S32: detection performance determination step). At the detection performance determination step S32, when the current index value is equal to or more than the determination index value P (Yes at step S32), it is determined that the detection performance of the digital image assures the detection performance of the film image, because the image quality of the digital image is high (step S33). Alternatively, at the detection performance determination step S32, when the current index value is smaller than the determination index value P (No at step S32), it is determined that the detection performance of the digital image does not assure the detection performance of the film image, because the image quality of the digital image is low (step S34).

After performing step S34, to improve the image quality of the digital image, a replacement of the image element 8 is notified to the inspector (step S35). After performing step S33, or after performing step S35, the flow of the detection equivalence evaluation method is finished.

In this manner, according to the present embodiment, it is possible to suitably evaluate the equivalence of the digital image with respect to the film image. Consequently, by taking a digital image of the test piece 5, on the basis of the photographing conditions corresponding to the digital image determined that there is equivalence, it is possible to acquire a digital image having detection performance equal to or more than that of the film image. Thus, because it is possible to suitably detect a defect generated on the test piece 5, it is possible to replace the film system for acquiring a film image with the digital system for acquiring a digital image. Because it is possible to inspect an object to be inspected through the digital system, it is possible to improve the efficiency of the inspection work.

Moreover, according to the present embodiment, it is possible to effectively select the combination of the parameters with varied parameter values, on the basis of the experimental planning method. Consequently, it is possible to improve the work efficiency at the first digital image acquisition step.

Furthermore, according to the present embodiment, by performing the correlation acquisition step S28, it is possible to specify the evaluation index that affects the digital detection limit value, in other words, the parameter in the image quality conditions.

Still furthermore, according to the present embodiment, by performing the detection equivalence evaluation method illustrated in FIG. 3, it is possible to suitably determine whether the detection performance of the digital image assures the detection performance of the film image.

It is to be noted that in the present embodiment, at the first digital image acquisition step S21, the digital images are acquired by varying the parameter values of the parameters in the photographing conditions. However, the parameters with varied parameter values are not limited to the parameters in the photographing conditions. For example, the digital images may also be acquired by varying the parameter values of the parameters in the image quality conditions of the digital image.

Still furthermore, in the present embodiment, for example, the size of the defect generated on the test piece 5 that is to be the detectable limit, is applied to the film detection limit value and the digital detection limit value. However, it is not particularly limited, and the film detection limit value and the digital detection limit value may be any value as long as the value can be used to determine the detection limit of the image.

REFERENCE SIGNS LIST

1 Photographing device
5 Test piece
6 Radiation source
7 Shielding plate
8 Image element
10 Detection equivalence evaluation device
11 Control unit
12 Storage unit
13 Input unit
14 Display unit

The invention claimed is:
1. A method of evaluating equivalence of detection performance of an object to be photographed using a film image obtained by exposing a film to light and detection performance of the object to be photographed using a digital image obtained by causing an image element to receive light, the method comprising:
   photographing the object based on a specified condition in which detection performance is assured in advance to acquire the film image of the object;
   acquiring a film detection limit value that is a limit value of detection performance of the acquired film image;

photographing the object with varying values of a plurality of parameters included in a photographing condition of the object to acquire a plurality of first digital images of the object;
acquiring a plurality of first digital detection limit values that are limit values of detection performance of the respective first digital images;
specifying, based on relations between the first digital detection limit values and the parameters with varying values, an influence parameter that affects the detection performance of the digital image from the parameters;
photographing the object with varying values of the specified influence parameter and an image quality condition of the first digital images to acquire a plurality of second digital images of the object;
acquiring a plurality of second digital detection limit values of the respective second digital images;
specifying a minimum digital detection limit value with a highest detection performance from the second digital detection limit values;
determining that the digital image is equivalent to the film image because the detection performance of the object in the digital image assures the detection performance of the object photographed in the film image when the minimum digital detection limit value is equal to or more than the film detection limit value; and
determining that the digital image is not equivalent to the film image because the detection performance of the object in the digital image does not assure the detection performance of the object in the film image when the minimum digital detection limit value is smaller than the film detection limit value.

2. The method according to claim 1, wherein acquiring the first digital images includes selecting the parameters whose values are to be varied based on an experimental planning method.

3. The method according to claim 1, wherein:
the photographing of the object to acquire the plurality of the second digital images includes (i) setting the parameters of the image quality condition of the second digital images as a plurality of evaluation indexes, and (ii) acquiring the evaluation indexes by associating the evaluation indexes with the minimum detection limit values of the second digital images, and
the method further comprises:
when it is determined that the digital image is equivalent to the film image, determining whether there is a correlation between the minimum detection limit values and the evaluation indexes, and
aquiring the evaluation index having the correlation.

4. The method according to claim 3, wherein
by using the evaluation indexes having the correlation with the minimum detection limit values, a determination index value that is an index value of the evaluation index corresponding to the film detection limit value is derived in advance, and
the method further comprises:
acquiring a current index value of the evaluation index for a current digital image having correlation with the minimum detection limit value;
determining, when the current index value is equal to or more than the determination index value, that the detection performance of the object to be photographed using the digital image assures the detection performance of the object to be photographed using the film image; and
determining, when the current index value is smaller than the determination index value, that the detection performance of the object to be photographed using the digital image does not assure the detection performance of the object to be photographed using the film image.

5. A detection equivalence evaluation device comprising a processor configured to evaluate equivalence of detection performance of an object to be photographed using a film image obtained by exposing a film to light and detection performance of the object to be photographed using a digital image obtained by causing an image element to receive light,
the processor being configured to:
photograph the object based on a specified condition in which detection performance is assured in advance to acquire the film image of the object;
acquire a film detection limit value that is a limit value of detection performance of the acquired film image;
photograph the object with varying values of a plurality of parameters included in a photographing condition of the object to acquire a plurality of first digital images of the object;
acquire a plurality of first digital detection limit values that are limit values of detection performance of the respective first digital images;
specify, based on relations between the first digital detection limit values and the parameters with varying values, an influence parameter that affects the detection performance of the digital image from the parameters;
photograph the object with varying values of the specified influence parameter and an image quality condition of the first digital images to acquire a plurality of second digital images of the object;
acquire a plurality of second digital detection limit values of the respective second digital images;
specify a minimum detection limit value with a highest detection performance from the second digital detection limit values;
determine that the digital image is equivalent to the film image because the detection performance of the object in the digital image assures the detection performance of the object photographed in the film image when the minimum digital detection limit value is equal to or more than the film detection limit value; and
determine that the digital image is not equivalent to the film image because the detection performance of the object in the digital image does not assure the detection performance of the object in the film image when the minimum digital detection limit value is smaller than the film detection limit value.

* * * * *